United States Patent
Aya et al.

(10) Patent No.: US 11,403,294 B1
(45) Date of Patent: Aug. 2, 2022

(54) SMART SCAN HASH JOIN OPTIMIZATION

(71) Applicant: Snowflake Inc., Bozeman, MT (US)

(72) Inventors: Selcuk Aya, San Carlos, CA (US); Xinzhu Cai, San Mateo, CA (US); Florian Andreas Funke, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/461,477

(22) Filed: Aug. 30, 2021

(51) Int. Cl.
G06F 16/2453 (2019.01)
G06F 16/22 (2019.01)

(52) U.S. Cl.
CPC .... *G06F 16/24537* (2019.01); *G06F 16/2255* (2019.01); *G06F 16/24539* (2019.01)

(58) Field of Classification Search
CPC .......... G06F 16/24537; G06F 16/2255; G06F 16/24539
See application file for complete search history.

(56) References Cited

U.S. PATENT DOCUMENTS

| | | | |
|---|---|---|---|
| 2011/0179341 A1* | 7/2011 | Falls .................... | H03M 7/3088 714/807 |
| 2014/0089572 A1* | 3/2014 | Koka .................. | G06F 12/1072 711/105 |
| 2018/0089261 A1* | 3/2018 | Li ........................ | G06F 16/2456 |
| 2021/0081410 A1* | 3/2021 | Chavan ............... | G06F 16/2255 |
| 2021/0232505 A1* | 7/2021 | Breslow ............. | G06F 12/0864 |

OTHER PUBLICATIONS

Viana et al., "A table-based method for single-pass cache optimization", GLSVLSI '08: Proceedings of the 18th ACM Great Lakes symposium on VLSIMay 2008 pp. 71-76 https://doi.org/10.1145/1366110.1366129 (Year: 2008).*

* cited by examiner

*Primary Examiner* — Mark D Featherstone
*Assistant Examiner* — Kweku William Halm
(74) *Attorney, Agent, or Firm* — Schwegman Lundberg & Woessner, P.A.

(57) ABSTRACT

In one aspect, a computer-implemented method includes detecting, by a server includes one or more processors, a request to perform a hash join operation on a data structure stored in a data storage device, forming a hash lookup dictionary based on lookup results in a hash table, storing the hash lookup dictionary in a cache, and probing, during a probing phase of the hash join operation, the cache.

17 Claims, 16 Drawing Sheets

702

| WORKER TABLE | |
|---|---|
| NAME | LOCATION |
| KARA | SAN JOSE |
| LARA | PORTLAND |
| MARLON | SEATTLE |
| MERA | SEATTLE |
| SAMUEL | SEATTLE |
| YANA | SAN JOSE |

704

| STORE TABLE | |
|---|---|
| NAME | LOCATION |
| SAFEWAY | PORTLAND |
| TRADER JOES | SEATTLE |
| WHOLE FOODS | SAN JOSE |

706

| WORKER.LOCATION DICTIONARY | |
|---|---|
| LOCATION | VALUE |
| SAN JOSE | 1 |
| PORTLAND | 2 |
| SEATTLE | 3 |

FIG. 7

SMART SCAN HASH JOIN OPTIMIZATION

TECHNICAL FIELD

The present disclosure generally relates to special-purpose machines that evaluate database queries, and to the technologies by which such special-purpose machines become improved compared to other special-purpose machines for evaluating database queries.

BACKGROUND

Databases are widely used for data storage and access in computing applications. Databases may include one or more tables that include or reference data that can be joined, read, modified, or deleted using queries. Databases can store small or extremely large sets of data within one or more tables.

A join operation may be conducted on database data and cause columns from one or more database tables to be merged. Relational databases are often normalized to eliminate duplication of information such as when an entity type may have one-to-many relationships with a plurality of other entity types. A join operation may be utilized to join entity types according to certain join predicates. A join operation may be utilized in response to a database query to return the appropriate entity types that are requested in the query.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 shows an example database architecture for implementing a hash join operation, in accordance with some embodiments of the present disclosure.

DETAILED DESCRIPTION

Figure 1:
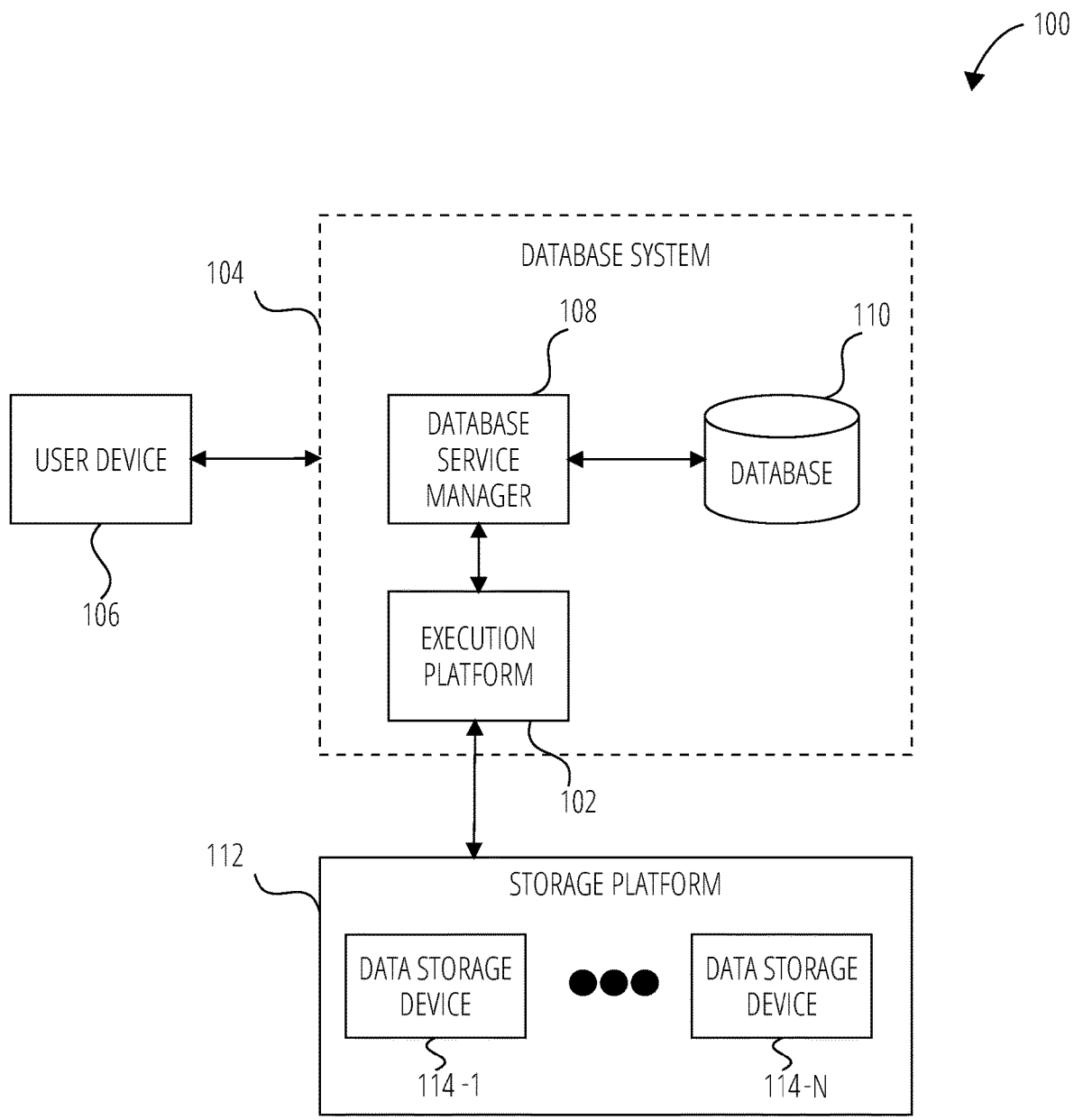
FIG. 1 illustrates an example computing environment that includes a network-based database system in communication with a cloud storage provider system, in accordance with some embodiments of the present disclosure.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Databases are widely used for data storage and access in computing applications. Databases may include one or more tables that include or reference data that can be joined, read, modified, or deleted using queries. Querying very large databases and/or tables might require scanning large amounts of data. Reducing the amount of data scanned is one of the main challenges of data organization and processing.

The term "micro-partition" is used herein to refer to a contiguous unit of storage that stores some or all of the data of a single table. In some example embodiments, each micro-partition stores between 50 and 500 MB of uncompressed data. Micro-partitions may be stored in a compressed or uncompressed form. Groups of rows in tables may be mapped into individual micro-partitions organized in a columnar fashion. In relational databases comprising rows and columns, all columns for the rows of a micro-partition are stored in the micro-partition. Some large tables are stored in millions or hundreds of millions of micro-partitions. The set of micro-partitions to scan in executing a query may be referred to herein as a "scan set."

In some example embodiments, a micro-partition is a file in a file system. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

A join is an operation in query processing that determines rows in two input streams that "match" with respect to some of their attributes. In an embodiment, those attributes are referred to as join keys. Join operations are typically very time-consuming operations during query execution. A known embodiment of a join operation includes a SQL join clause for combining columns from one or more tables in a relational database. The join clause is a means for combining columns from one or more tables by using values common to each of the one or more tables.

A hash join is an example of a join algorithm that may be used in the implementation of a relationship database management system. Various forms of hash joins are commonly used in database systems to compute the result of a join. Hash joins build one or more multiple hash tables with rows of one of the inputs (typically the smaller input) referred to as the "build side" input. The rows are probed from the other input (typically the larger input) referred to as the "probe side" input and into the hash tables. For massively parallel database systems with N servers, a broadcast join can be used.

A broadcast join is an example of a join algorithm where a single side of the data to be joined is materialized and sent to a plurality of workers or servers. Broadcast joins are efficient when the build side input fits into a main memory of a single server. Broadcast joins distribute all rows of the build side to all N servers and then hash partition the probe side over the servers such that each server of the N servers receives only a fraction of the probe side input. Each of the N servers probes its partition into its copy of the hash table wherein its copy of the hash table includes all data from the build side input.

The present application describes systems, methods, and devices for an improved hash join operation, and particularly for reducing the number of hash lookups of a probe-side hash table. In one example, the improved hash join operation accelerates broadcast joins where the build side is rather small while the probe side has a small NDV (number of distinct values) and a high cardinality (e.g. Row Level Security mapping table) by reducing hash value calculation and key comparison time.

The conventional implementation of a hash join operation includes building a global hash table and conducting hash table lookup on all probe rows. This can result in wasting a lot of time on duplicate hash value calculation and key comparison when the number of unique key values is small. The presently described hash join operation operates using dictionary-encoded join keys. In one example, the hash table lookup results are cached in an array, thereby reducing the number of hash lookups to the number of unique key values per micro-partition file. As such, the presently described hash join operation reduces the number of hash lookups from the number of rows per micro-partition file to the number of unique join keys per micro-partition file.

In an embodiment, a server or computing device has been tasked with a join operation. The server builds a hash table that stores rows from a first table based on hash values of a key. The server forms a hash look up dictionary based on unique join keys. The hash look up dictionary is stored in a cache. The server performs the probe phase by accessing the hash look up dictionary in the cache instead of the hash table.

As a result, one or more of the methodologies described herein facilitate solving the technical problem of duplicate hash value computation. As such, one or more of the methodologies described herein may obviate a need for certain efforts or computing resources that otherwise would be involved in hash look ups during the probe phase of hash join operations. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 illustrates an example computing environment 100 that includes a database system 104 in communication with a storage platform 112, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 104 and a storage platform 112 (e.g., AWS®, Microsoft Azure Blob Storage®, or Google Cloud Storage®). The database system 104 is used for reporting and analysis of integrated data from one or more disparate sources including data storage device 114-1 to data storage device 114-N within the storage platform 112. The storage platform 112 comprises a plurality of computing machines and provides on-demand computer system resources such as data storage and computing power to the database system 104.

The database system 104 comprises a database service manager 108, an execution platform 102, and a database 110. The database system 104 hosts and provides data reporting and analysis services to multiple client accounts. Administrative users can create and manage identities (e.g., users, roles, and groups) and use permissions to allow or deny access to the identities to resources and services.

The database service manager 108 coordinates and manages operations of the database system 104. The database service manager 108 also performs query optimization and compilation as well as managing clusters of compute services that provide compute resources (also referred to as "virtual warehouses"). The database service manager 108 can support any number of client accounts such as end users providing data storage and retrieval requests, system administrators managing the systems and methods described herein, and other components/devices that interact with the database service manager 108.

The database service manager 108 is also in communication with a user device 106. The user device 106 corresponds to a user of one of the multiple client accounts supported by the database system 104. In some embodiments, the database service manager 108 does not receive any direct communications from the user device 106 and only receives communications concerning jobs from a queue within the database system 104.

The database service manager 108 is also coupled to database 110, which is associated with the data stored in the computing environment 100. The database 110 stores data pertaining to various functions and aspects associated with the database system 104 and its users. In some embodiments, the database 110 includes a summary of data stored in remote data storage systems as well as data available from a local cache. Additionally, the database 110 may include information regarding how data is organized in remote data storage systems (e.g., storage platform 112) and the local caches. The database 110 allows systems and services to determine whether a piece of data needs to be accessed without loading or accessing the actual data from a storage device.

In some embodiments, the database service manager 108 may determine that a job should be performed based on data from the database 110. In such embodiments, the database service manager 108 may scan the data and determine that a job should be performed to improve data organization or database performance.

The database service manager 108 is further coupled to the execution platform 102, which provides multiple computing resources that execute various data storage and data retrieval tasks. The execution platform 102 is coupled to the storage platform 112. The storage platform 112 comprises multiple data storage devices 114-1 to 114-N. In some embodiments, the data storage devices 114-1 to 114-N are cloud-based storage devices located in one or more geographic locations. For example, the data storage devices 114-1 to 114-N may be part of a public cloud infrastructure or a private cloud infrastructure. The data storage devices 114-1 to 114-N may be hard disk drives (HDDs), solid state drives (SSDs), storage clusters, Amazon S3™ storage systems or any other data storage technology. Additionally, the storage platform 112 may include distributed file systems (e.g., Hadoop Distributed File Systems (HDFS)), object storage systems, and the like.

The execution platform 102 comprises a plurality of compute nodes. A set of processes on a compute node executes a query plan compiled by the database service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the database service manager 108; a fourth process to establish communication with the database service manager 108 after a system boot; and a fifth process to handle all communication with a compute cluster for a given job provided by the database service manager 108 and to communicate information back to the database service manager 108 and other compute nodes of the execution platform 102.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 114-1 to 114-N are decoupled from the computing resources associated with the execution platform 102. This architecture supports dynamic changes to the database system 104 based on the changing data storage/retrieval needs as well as the changing needs of the users and systems. The support of dynamic changes allows the database system 104 to scale quickly in response to changing demands on the systems and components within the database system 104. The decoupling of the computing resources from the data storage devices 114-1 to 114-N supports the storage of large amounts of data without requiring a corresponding large amount of computing resources. Similarly, this decoupling of resources supports a significant increase in the computing resources utilized at a particular time without requiring a corresponding increase in the available data storage resources.

The database service manager 108, the database 110, the execution platform 102, and the storage platform 112 are shown in FIG. 1 as individual discrete components. However, each of the database service manager 108, the database 110, the execution platform 102, and the storage platform 112 may be implemented as a distributed system (e.g., distributed across multiple systems/platforms at multiple geographic locations). Additionally, each of the database service manager 108, the database 110, the execution platform 102, and the storage platform 112 can be scaled up or down (independently of one another) depending on changes to the requests received and the changing needs of the database system 104. Thus, in the described embodiments, the database system 104 is dynamic and supports regular changes to meet the current data processing needs.

During typical operation, the database system 104 processes multiple jobs determined by the database service manager 108. These jobs are scheduled and managed by the database service manager 108 to determine when and how to execute the job. For example, the database service manager 108 may divide the job into multiple discrete tasks and may determine what data is needed to execute each of the multiple discrete tasks. The database service manager 108 may assign each of the multiple discrete tasks to one or more nodes of the execution platform 102 to process the task. The database service manager 108 may determine what data is needed to process a task and further determine which nodes within the execution platform 102 are best suited to process the task. Some nodes may have already cached the data needed to process the task and, therefore, be a good candidate for processing the task.

Metadata stored in the database 110 assists the database service manager 108 in optimizing user queries by determining which nodes in the execution platform 102 have already cached at least a portion of the data needed to process the task. In some embodiments, metadata includes a summary of data stored in remote data storage systems as well as data available from a local cache (e.g., a cache within one or more of the clusters of the execution platform 102). Additionally, metadata may include information regarding how data is organized in the remote data storage systems and the local caches. Metadata allows systems and services to determine whether a piece of data needs to be processed without loading or accessing the actual data from a storage device.

One or more nodes in the execution platform 102 process the task using data cached by the nodes and, if necessary, data retrieved from the storage platform 112. It is desirable to retrieve as much data as possible from caches within the execution platform 102 because the retrieval speed is typically much faster than retrieving data from the storage platform 112.

As shown in FIG. 1, the computing environment 100 separates the execution platform 102 from the storage platform 112. In this arrangement, the processing resources and cache resources in the execution platform 102 operate independently of the data storage devices 114-1 to 114-N in the storage platform 112. Thus, the computing resources and cache resources are not restricted to specific data storage devices 114-1 to 114-N. Instead, all computing resources and all cache resources may retrieve data from, and store data to, any of the data storage resources in the storage platform 112.

Figure 2:
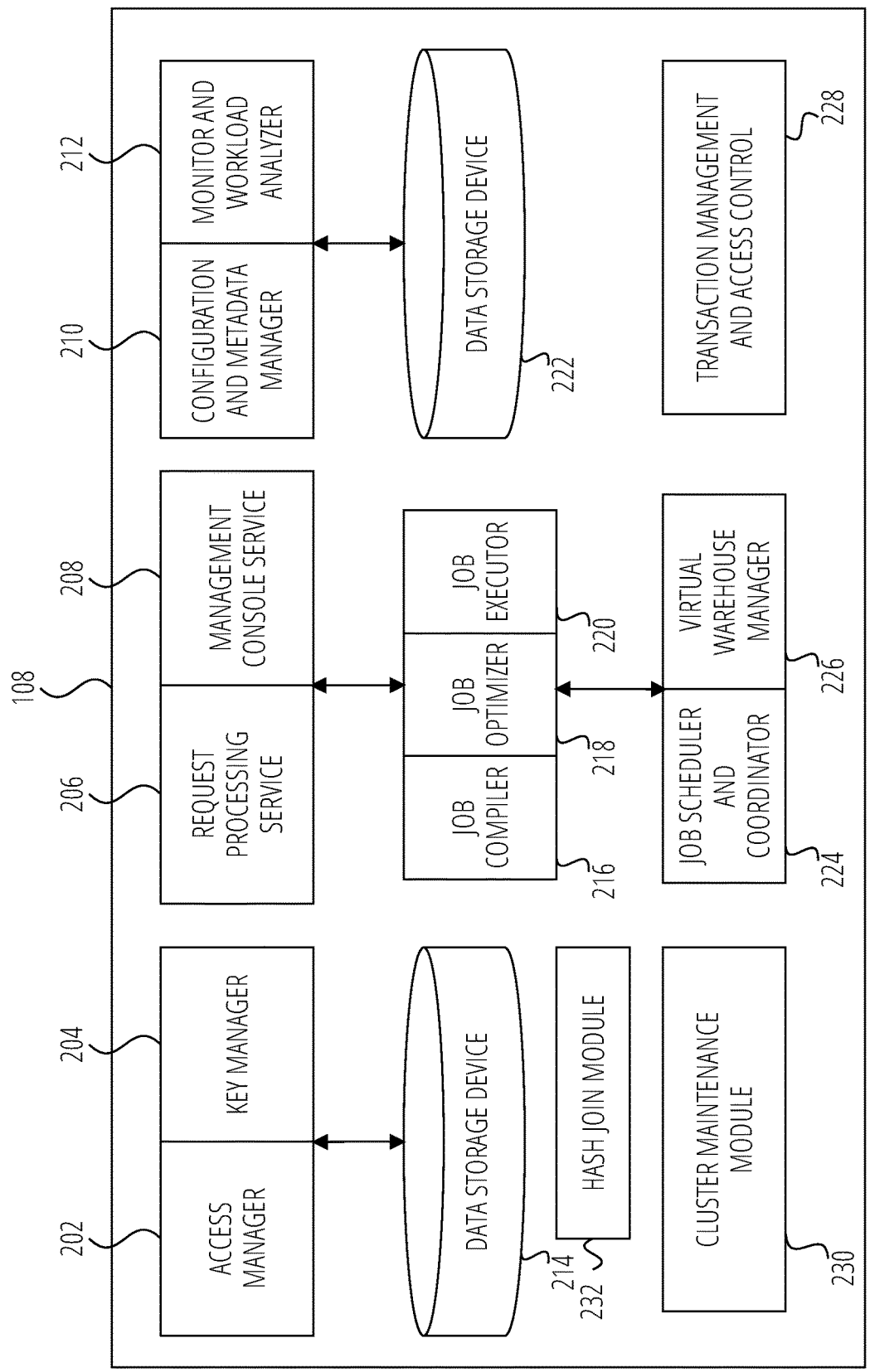
FIG. 2 is a block diagram illustrating components of a compute service manager, in accordance with some embodiments of the present disclosure.

FIG. 2 is a block diagram illustrating components of the database service manager 108, in accordance with some embodiments of the present disclosure. As shown in FIG. 2, the database service manager 108 includes an access manager 202, a key manager 204, a request processing service 206, a management console service 208, a configuration and metadata manager 210, a monitor and workload analyzer 212, a data storage device 214, a job compiler 216, a job optimizer 218, a job executor 220, a data storage device 222, a job scheduler and coordinator 224, a virtual warehouse manager 226, a transaction management and access control 228, a cluster maintenance module 230, and a hash join module 232.

The access manager 202 and the key manager 204 coupled to the data storage device 214. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices 114-1 to 114-N in storage platform 112). As used herein, the remote storage devices may also be referred to as "persistent storage devices" or "shared storage devices."

The request processing service 206 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 102 or in a data storage device in storage platform 112.

The management console service 208 supports access to various systems and processes by administrators and other system managers. Additionally, the management console service 208 may receive a request to execute a job and monitor the workload on the system.

The job compiler 216 parses a job into multiple discrete tasks and generates the execution code for each of the multiple discrete tasks. The job optimizer 218 determines the best method to execute the multiple discrete tasks based on the data that needs to be processed. The job optimizer 218 also handles various data pruning operations and other data optimization techniques to improve the speed and efficiency of executing the job. The job executor 220 executes the execution code for jobs received from a queue or determined by the database service manager 108.

The job scheduler and coordinator 224 sends received jobs to the appropriate services or systems for compilation, optimization, and dispatch to the execution platform 102. For example, jobs may be prioritized and processed in that prioritized order. In an embodiment, the job scheduler and coordinator 224 determines a priority for internal jobs that are scheduled by the database service manager 108 with other "outside" jobs such as user queries that may be scheduled by other systems in the database but may utilize the same processing resources in the execution platform 102. In some embodiments, the job scheduler and coordinator 224 identifies or assigns particular nodes in the execution platform 102 to process particular tasks.

The virtual warehouse manager 226 manages the operation of multiple virtual warehouses implemented in the execution platform 102. As discussed below, each virtual warehouse includes multiple execution nodes that each include a cache and a processor.

The configuration and metadata manager 210 manages the information related to the data stored in the remote data storage devices and in the local caches (e.g., the caches in execution platform 102). In one example, the configuration and metadata manager 210 uses the metadata to determine which data micro-partitions need to be accessed to retrieve data for processing a particular task or job.

The monitor and workload analyzer 212 oversees processes performed by the database service manager 108 and manages the distribution of tasks (e.g., workload) across the virtual warehouses and execution nodes in the execution platform 102. The monitor and workload analyzer 212 also redistributes tasks, as needed, based on changing workloads throughout the database system 104 and may further redistribute tasks based on a user (e.g., "external") query workload that may also be processed by the execution platform 102. The configuration and metadata manager 210 and monitor and workload analyzer 212 are coupled to the data storage device 222. The data storage device 222 and the data storage device 214 represent any data storage device within the database system 104. For example, data storage device 222 and the data storage device 214 may represent caches in execution platform 102, storage devices in storage platform 112, or any other storage device.

The transaction management and access control 228 manages the various tasks and other activities associated with the processing of data storage requests and data access requests. For example, the transaction management and access control 228 provides consistent and synchronized access to data by multiple users or systems. Since multiple users/systems may access the same data simultaneously, changes to the data may be synchronized to ensure that each user/system is working with the current version of the data. The transaction management and access control 228 provides control of various data processing activities at a single, centralized location in database service manager 108.

The cluster maintenance module 230 manages the clustering and ordering of partitions of a table. The cluster maintenance module 230 may partition each table in a database into one or more partitions or micro-partitions. The cluster maintenance module 230 may not require or achieve ideal clustering for the table data but may maintain "good enough" or approximate clustering. For example, ideal clustering on a specific attribute may result in each partition either having non-overlapping value ranges or having only a single value for the specific attribute. Because the cluster maintenance module 230 does not require perfect clustering, significant processing and memory resources may be conserved during data loading or DML command operations.

The hash join module 232 enables the improved hash join operation by reducing the number of hash lookups of a probe-side hash table. In one example, the hash join module 232 forms a hash table lookup dictionary based on hash table lookup results. The hash table look up dictionary is cached in an array. The number of hash lookups is reduced to the number of unique key values per micro-partition file. In one example, the hash join module 232 reduces the number of hash lookups from the number of rows per micro-partition file to the number of unique join keys per micro-partition file.

In one example embodiment, the database service manager 108 has been tasked with a hash join operation. The hash join module 232 builds a hash table that stores rows from a build-side table based on hash values of a key. The hash join module 232 forms a hash look up dictionary based on unique join keys. The hash look up dictionary is stored in a cache. The hash join module 232 performs the probe phase of a probe-side table by accessing the hash look up dictionary in the cache instead of the hash table.

At least some embodiments may manage the ordering or clustering of a table using micro-partitions. As mentioned previously, traditional data warehouses rely on static partitioning of large tables to achieve acceptable performance and enable better scaling. In these systems, a partition is a unit of management that is manipulated independently using specialized data definition language (DDL) and syntax. However, static partitioning has a number of well-known limitations, such as maintenance overhead and data skew, which can result in disproportionately-sized partitions. Embodiments disclosed herein may implement a powerful and unique form of partitioning, called micro-partitioning, that delivers all the advantages of static partitioning without the known limitations, as well as providing additional significant benefits.

In one embodiment, all data in tables is automatically divided into micro-partitions, which are contiguous units of storage. By way of example, each micro-partition may contain between 50 MB and 500 MB of uncompressed data (note that the actual size in storage may be smaller because data may be stored compressed). Groups of rows in tables are mapped into individual micro-partitions, organized in a columnar fashion. This size and structure allows for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Figure 3:
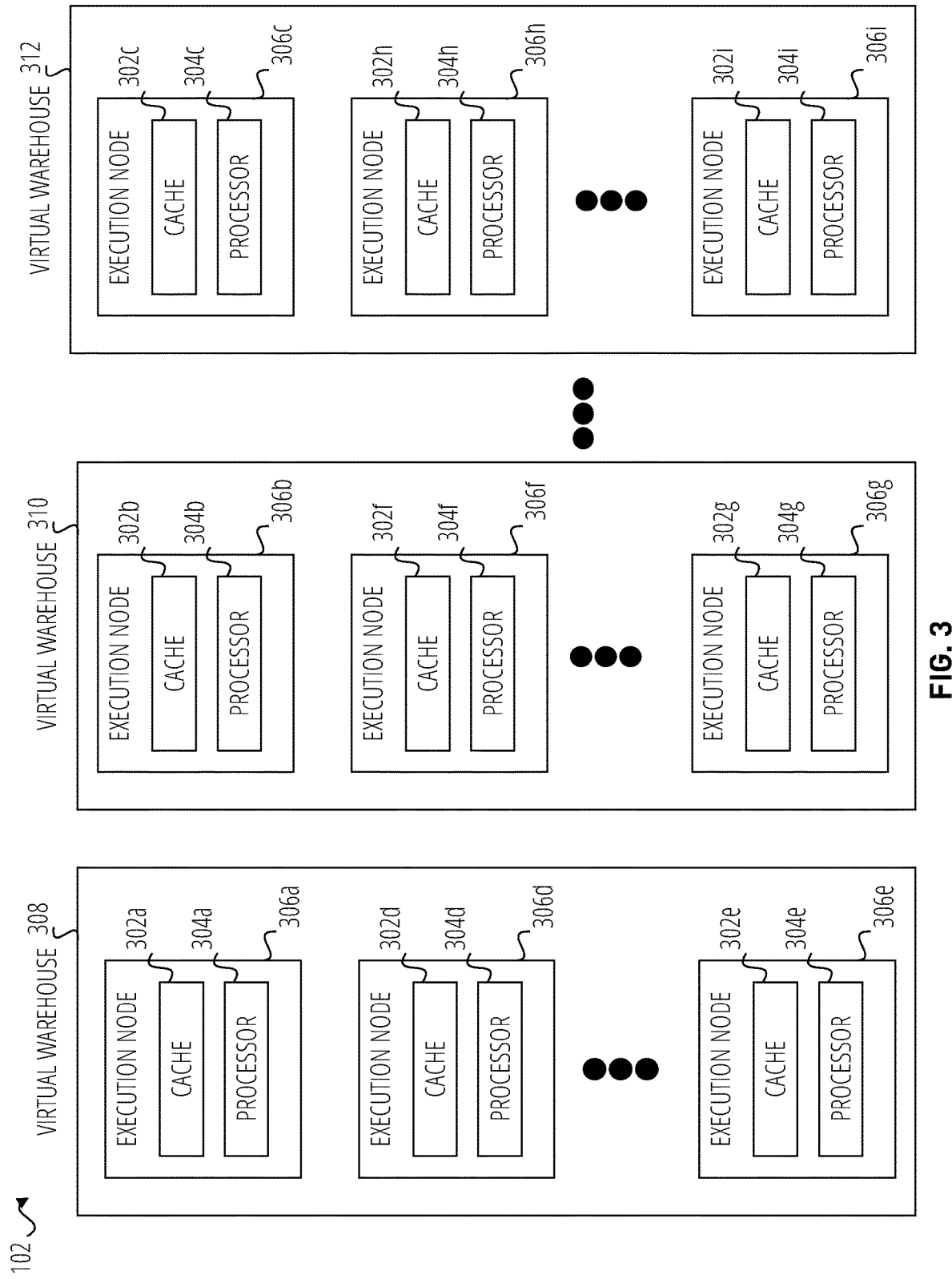
FIG. 3 is a block diagram illustrating components of an execution platform, in accordance with some embodiments of the present disclosure.

FIG. 3 is a block diagram illustrating components of the execution platform 102, in accordance with some embodiments of the present disclosure. As shown in FIG. 3, the execution platform 102 includes multiple virtual warehouses, including virtual warehouse 308, virtual warehouse 310, virtual warehouse 312. Each virtual warehouse includes multiple execution nodes that each includes a data cache and a processor. The virtual warehouses can execute multiple tasks in parallel by using the multiple execution nodes. As discussed herein, the execution platform 102 can add new virtual warehouses and drop existing virtual warehouses in real-time based on the current processing needs of the systems and users. This flexibility allows the execution platform 102 to quickly deploy large amounts of computing resources when needed without being forced to continue paying for those computing resources when they are no longer needed. All virtual warehouses can access data from any data storage device (e.g., any storage device in storage platform 112).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 114-1 to 114-N shown in FIG. 1. Thus, the virtual warehouses are not necessarily assigned to a specific data storage devices 114-1 to 114-N and, instead, can access data from any of the data storage devices 114-1 to 114-N within the storage platform 112. Similarly, each of the execution nodes shown in FIG. 3 can access data from any of the data storage devices 114-1 to 114-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 308 includes three execution nodes (execution node 306a, 306d, 306e). The execution node 306a includes a cache 302a and a processor 304a. Execution node 306d includes a cache 302d and a processor 304d. Execution node 306e includes a cache 302e and a processor 304e.

Each execution node 306a, 306d, 306e is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 308 discussed above, virtual warehouse 310 includes three execution nodes (execution node 306b, 306f, 306g). Execution node 306b includes a cache 302b and a processor 304b. Execution node 306f includes a cache 302f and a processor 304f. Execution node 306g includes a cache 302g and a processor 304g.

Similar to virtual warehouse 308 and virtual warehouse 310 discussed above, virtual warehouse 312 includes three execution nodes (execution node 306c, 306h, 306i). Execution node 306c includes a cache 302c and a processor 304c. Execution node 306h includes a cache 302h and a processor 304h. Execution node 306i includes a cache 302i and a processor 304i.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 112. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 112.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouse 308, 310, and 312 are associated with the same execution platform 102, the virtual warehouses may be implemented using multiple computing systems at multiple geographic locations. For example, virtual warehouse 308 can be implemented by a computing system at a first geographic location, while virtual warehouse 310 and virtual warehouse 312 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 308 implements execution node 306a and 306d on one computing platform at a geographic location and implements execution node 306e at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 102 is also fault tolerant. For example, if one virtual warehouse fails, that virtual warehouse is quickly replaced with a different virtual warehouse at a different geographic location.

A particular execution platform 102 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 112, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
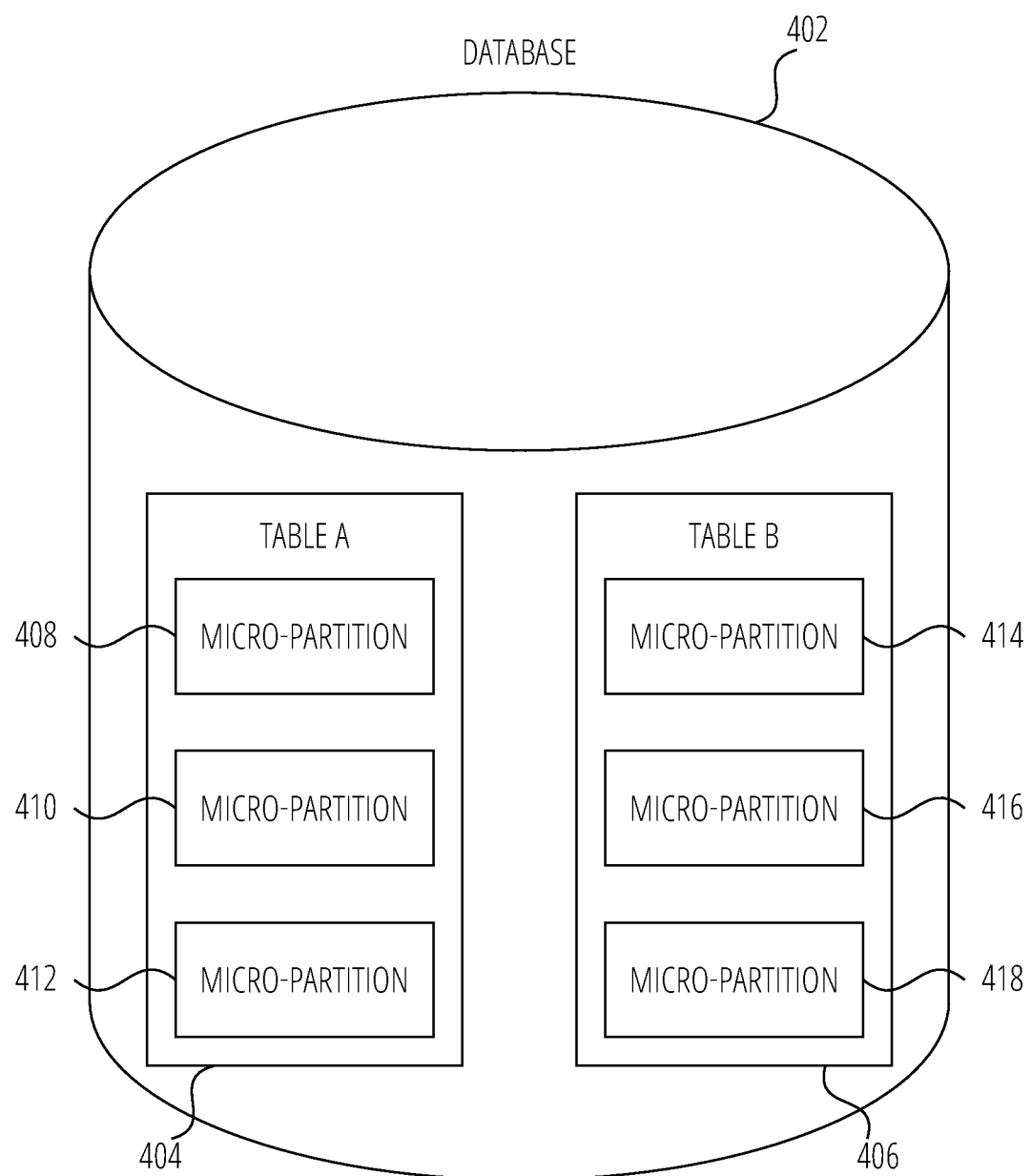
FIG. 4 is a block diagram illustrating storage of database tables in micro-partitions, in accordance with some embodiments of the present disclosure.

FIG. 4 is a block diagram of a database 402 illustrating storage of database tables in micro-partitions, according to some example embodiments. The database 402 includes table A 404 and table B 406. The table A 404 is stored in micro-partitions 408, 410, and 412. The table B 406 is stored in micro-partitions 414, 416, and 418. Each micro-partition may be implemented as a file in a file system.

Each of the micro-partitions 408-418 may be compressed or uncompressed. Furthermore, each of the compressed micro-partitions may be compressed using a different compression algorithm. Thus, the micro-partition 408 may have a first column stored using dictionary compression, the micro-partition 410 may be stored uncompressed, and the micro-partition 412 may store a second column using dictionary compression. Similarly, the micro-partition 414 may have a first column stored using dictionary compression, the micro-partition 416 may have the first column and a second column stored using dictionary compression, and the micro-partition 418 may be stored using run-length encoding for the same or different columns.

Figure 5:
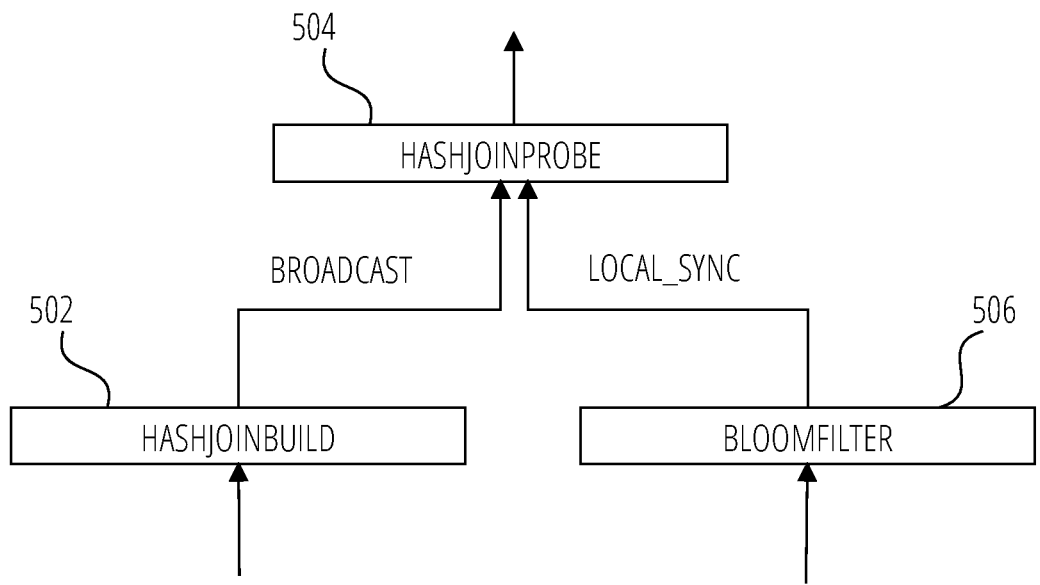
FIG. 5 is a schematic diagram illustrating an example hash join operation, in accordance with some embodiments of the present disclosure.

FIG. 5 is a schematic diagram illustrating an example hash join operation according to an embodiment of the disclosure. A hash join operation may be implemented using HashJoinBuild 502 for the build phase and HashJoinProbe 504 for the probe phase.

At HashJoinBuild 502, the hash join module 232 partitions the build and builds one bloom vector on the rows the hash join module 232 receives. When a local instance of HashJoinProbe 504 is initialized, it will first build one hash-table on the build partitions and then lookup matching rows for the probe rows in the hash table.

There are two modes of hash join execution: broadcast mode and hash-hash mode. The broadcast mode applies to cases where the build side is significantly smaller than the available memory. The build input is forwarded to all HashJoinProbe workers. Thus, there is a broadcast link from HashJoinBuild 502 to HashJoinProbe 504 and a local synchronous link from BloomFilter 506 to HashJoinProbe 504. In hash-hash mode, the link from HashJoinBuild 502 to HashJoinProbe 504 will be local_sync and the link from BloomFilter 506 to HashJoinProbe 504 will be hash_async.

Figure 6:
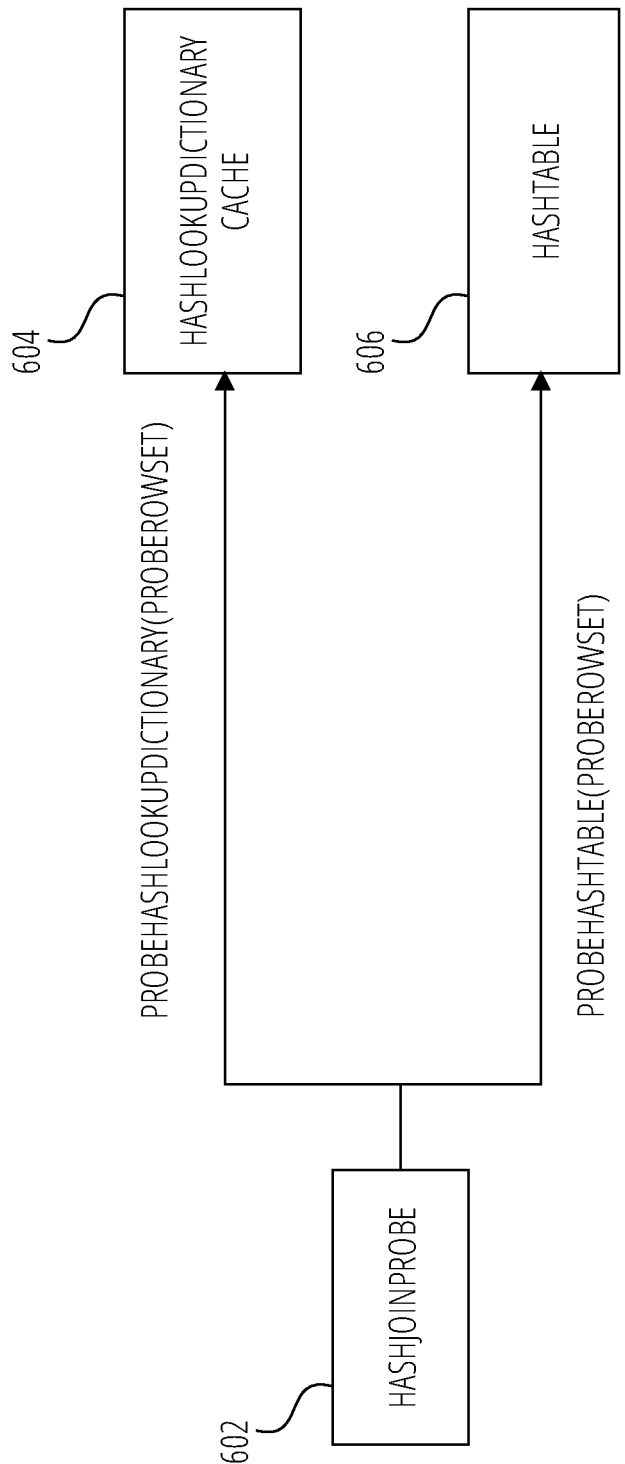
FIG. 6 is a schematic diagram illustrating an example hash join operation, in accordance with some embodiments of the present disclosure.

FIG. 6 is a schematic diagram illustrating an example hash join operation according to an embodiment of the disclosure. In a conventional hash join operation, in order to find matching build rows, every probe row undergoes through the full pipeline of hash value calculation, hash table lookup and potentially hash key comparison. In contrast, the presently described hash join operation avoids duplicate computation by implementing a HashLookupDictionary cache 604 that is used as a cache for hash table lookup results. The HashLookupDictionary cache 604 is valid across rowsets from the same micro-partition file because the dictionary-encoding decision is made separately on each file.

Instead of probing the HashTable 606 for the input probe rowset in the probe phase of the HashJoinProbe 602 (e.g., probeHashTable), the workflow of probeHashLookupDictionary operation is as follows:

The HashJoinProbe 602 initializes a new HashLookupDictionary cache 604 when the input probe rowset is from a different file. The HashJoinProbe 602 updates rowset-specific states in the HashLookupDictionary cache 604 to prepare for lookup and find out whether there are cache misses. If there are cache misses, the HashJoinProbe 602 probes the hash table for distinct cache-miss rows and update the cache accordingly. The HashJoinProbe 602 then probes the HashLookupDictionary cache 604 for the input probe rowset.

In one example embodiment, for each micro-partition file, the HashLookupDictionary cache 604 stores hash table lookup results in arrays inside a HashLookupDictionary indexed by dictionary positions. Every join key corresponds to a dictionary column set with a fixed number of entries. As such, multi-keys are flattened into a one-dimensional array. The size of this array is the number of all possible combinations of join keys.

In one example embodiment, the hash join module 232 may be implemented using the following APIs:
    initRowsetLookupState: this API is called before insert or lookup results for a rowset. This API calculates dictionary indexes and finds missing rows.
    insertRows: this API inserts hash table lookup results for the rowset on which initRowsetLookupState is called.
    lookupRows: this API accesses hash table lookup results for the rowset on which initRowsetLookupState is called.

Figure 8:
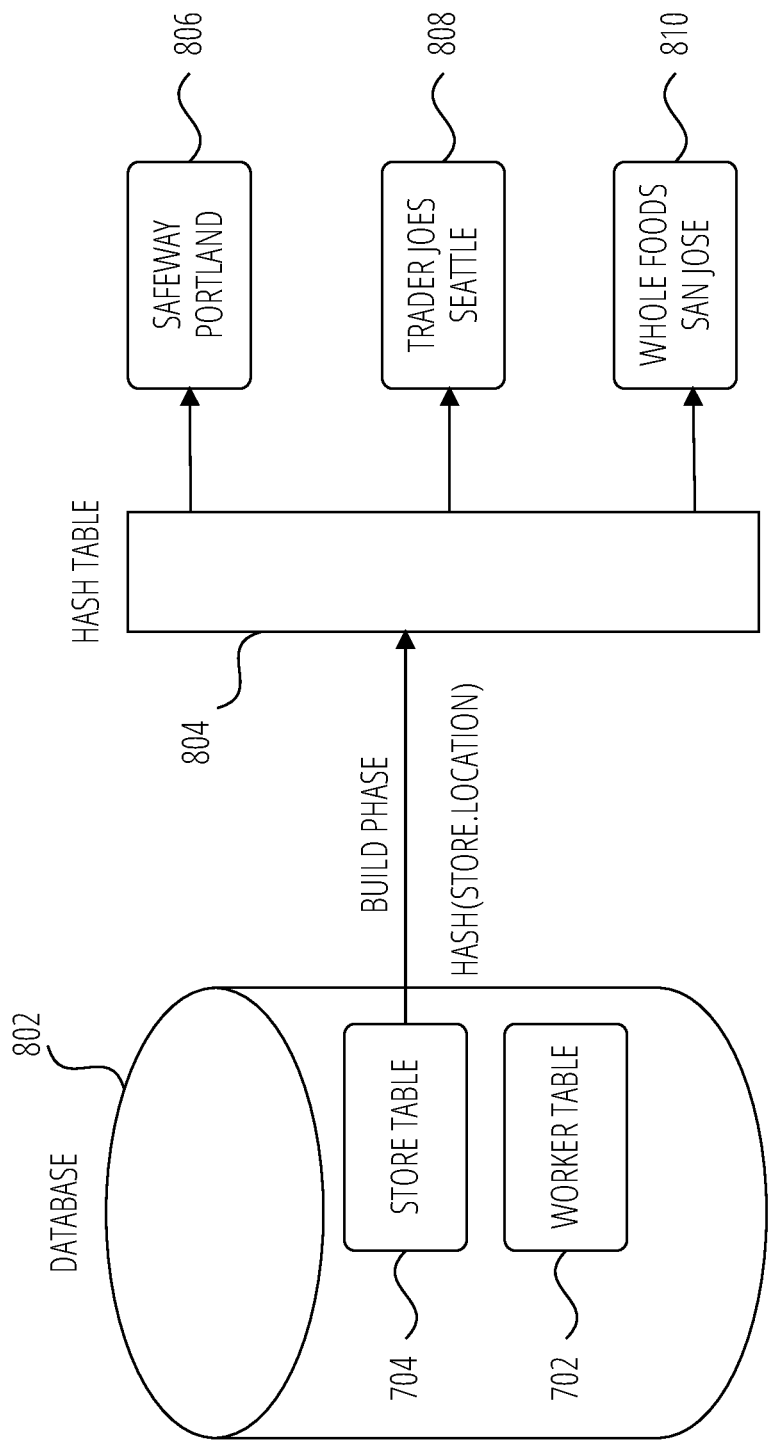
FIG. 8 is a block diagram illustrating an example build phase of a hash join operation, in accordance with some embodiments of the present disclosure.

FIG. 7 shows an example database architecture for implementing a hash join operation, according to an embodiment of the disclosure. The example database includes a worker table 702, a store table 704, and a dictionary metadata 706. The following is an example of hash join operation:
    select worker.name
    from store join worker on store.location=worker.location FIG. 8 is a block diagram illustrating an example build phase of a hash join operation in accordance with one embodiment. A database 802 stores the store table 704 and the worker table 702.

In the build phase of a hash join operation, the hash join module 232 builds a hash table 804 that stores rows from the store table 704 based on the hash value of store.location (e.g., safeway portland 806, trader joes seattle 808, whole foods san jose 810).

Figure 9A:
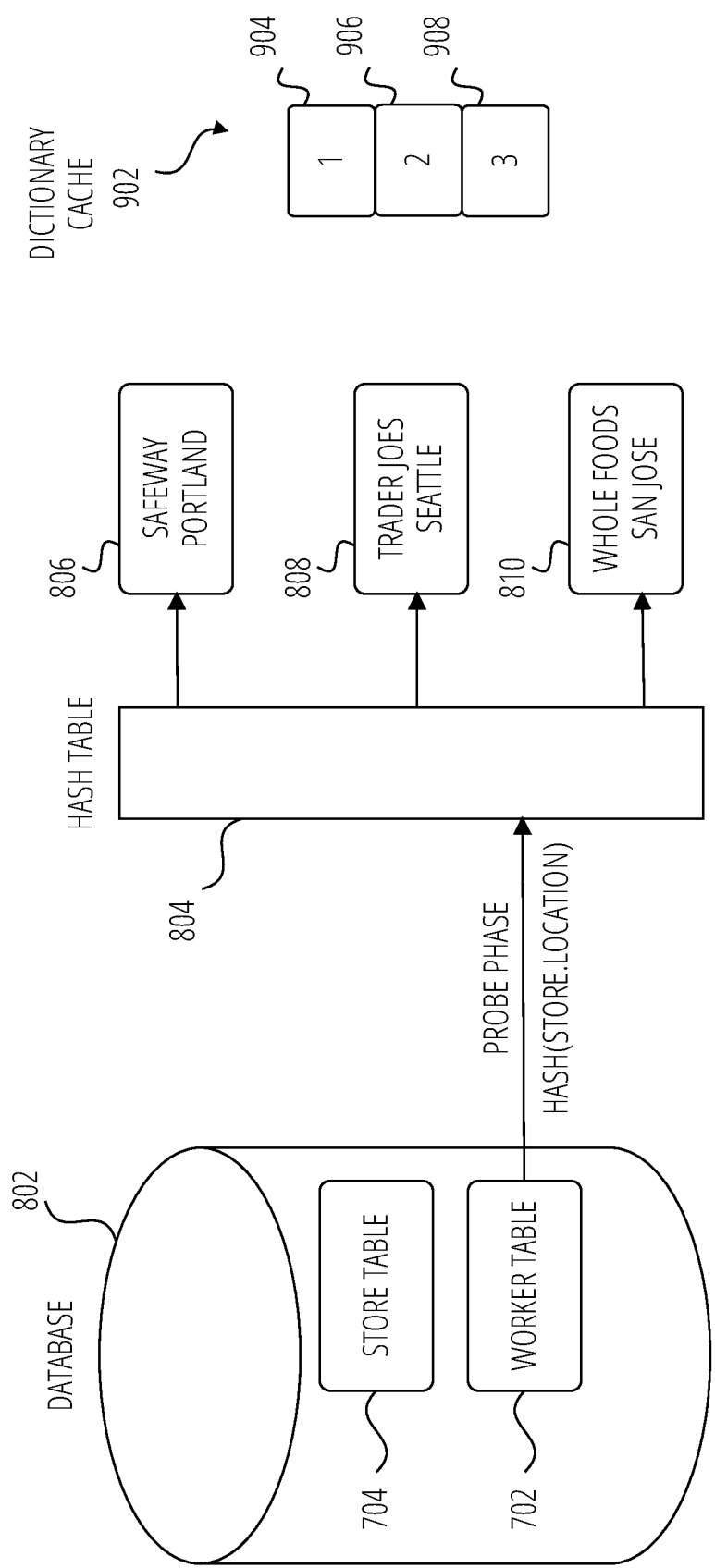
FIG. 9A is a block diagram illustrating an example probe phase of a hash join operation, in accordance with some embodiments of the present disclosure.

FIG. 9A is a block diagram illustrating an example probe phase of a hash join operation in accordance with one embodiment. In the probe phase of the hash join operation, the hash join module 232 first creates an empty dictionary cache 902 for worker.location dictionary. For the first three rows, the hash join module 232 probes the hash table to find matching rows in the worker table 702 and populate the dictionary cache 902 with the lookup results (e.g., entry 904, entry 906, entry 908).

Figure 9B:
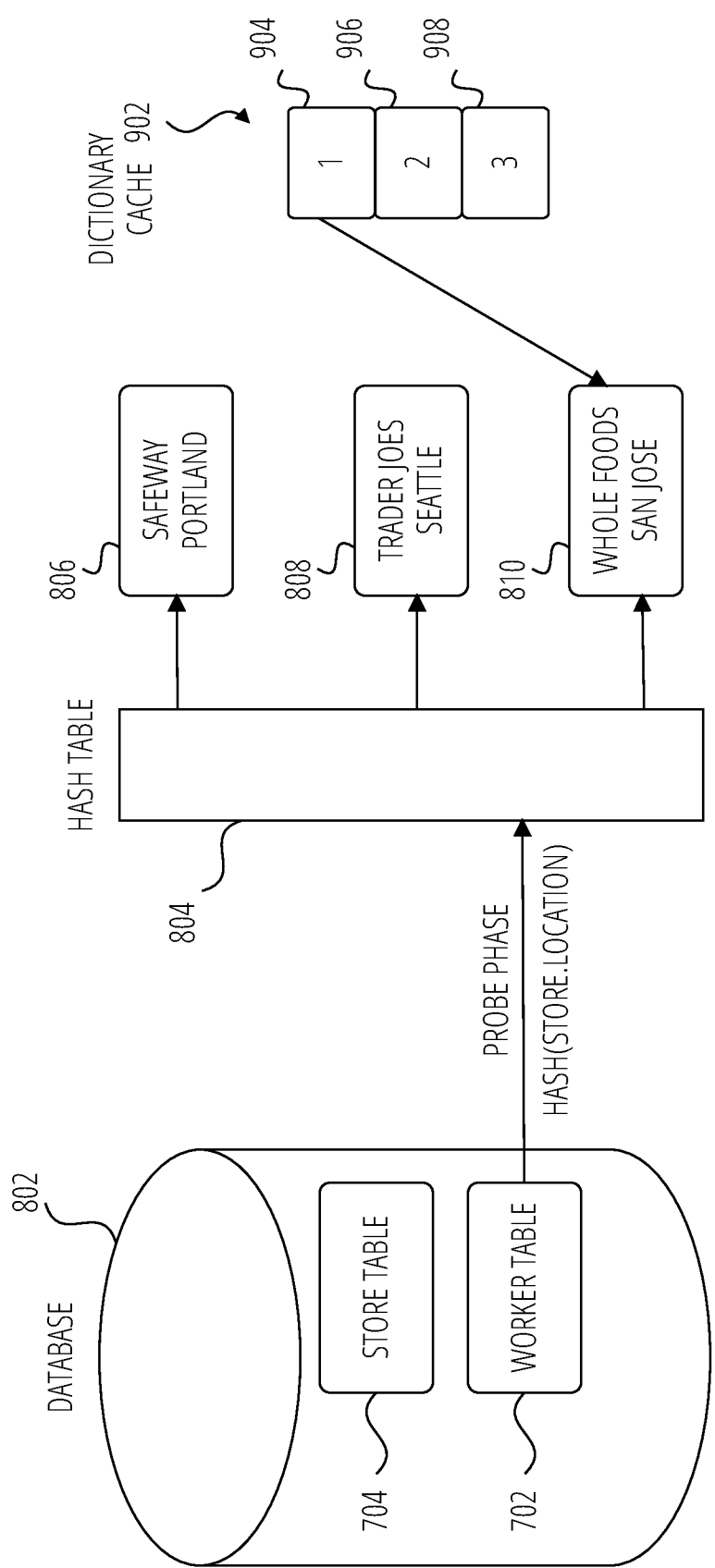
FIG. 9B is a block diagram illustrating an example probe phase of a hash join operation, in accordance with some embodiments of the present disclosure.

FIG. 9B is a block diagram illustrating an example probe phase of a hash join operation in accordance with one embodiment. The first row of worker table 702 indicates a location of SAN JOSE. Using the dictionary metadata 706, the hash join module 232 identifies that the dictionary value corresponding to SAN JOSE is 1. The hash join module 232 further detects that the corresponding dictionary entry is empty. This is represented by no arrows coming out of entry 904.

The hash join module 232 calculates the hash value to find an entry in the hash table 804. After computing the hash value, the hash join module 232 updates the corresponding dictionary entry (entry 904) to store the lookup result. This update is represented by an arrow from entry 904 to whole foods san jose 810).

Figure 9C:
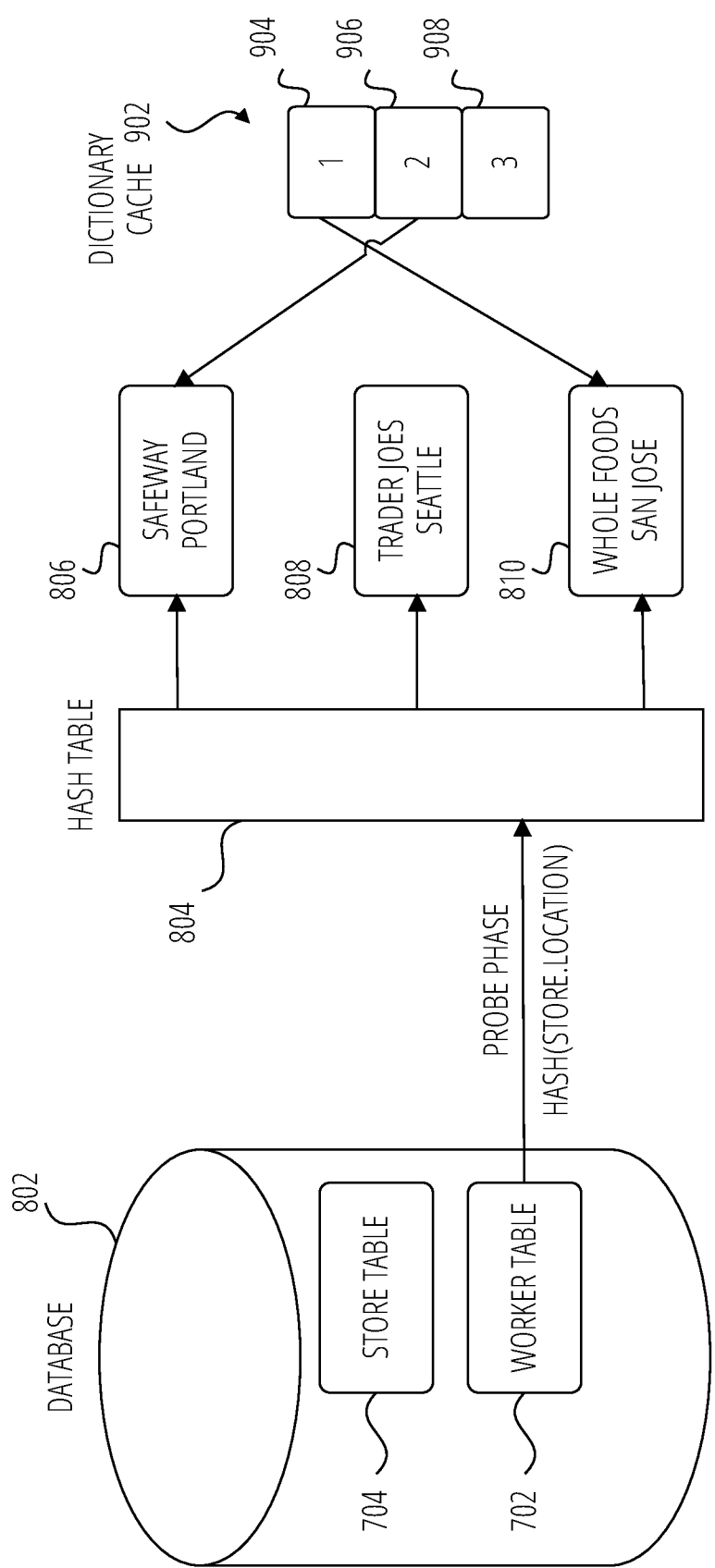
FIG. 9C is a block diagram illustrating an example probe phase of a hash join operation, in accordance with some embodiments of the present disclosure.

FIG. 9C is a block diagram illustrating an example probe phase of a hash join operation in accordance with one embodiment. The second row of worker table 702 indicates a location of PORTLAND. Using the dictionary metadata 706, the hash join module 232 identifies that the dictionary value corresponding to PORTLAND is 2. The hash join module 232 further detects that the corresponding dictionary entry is empty. This is represented by no arrows coming out of entry 906.

The hash join module 232 calculates the hash value to find an entry in the hash table 804. After computing the hash value, the hash join module 232 updates the corresponding dictionary entry (entry 906) to store the lookup result. This update is represented by an arrow from entry 906 to safeway portland 806).

Figure 9D:
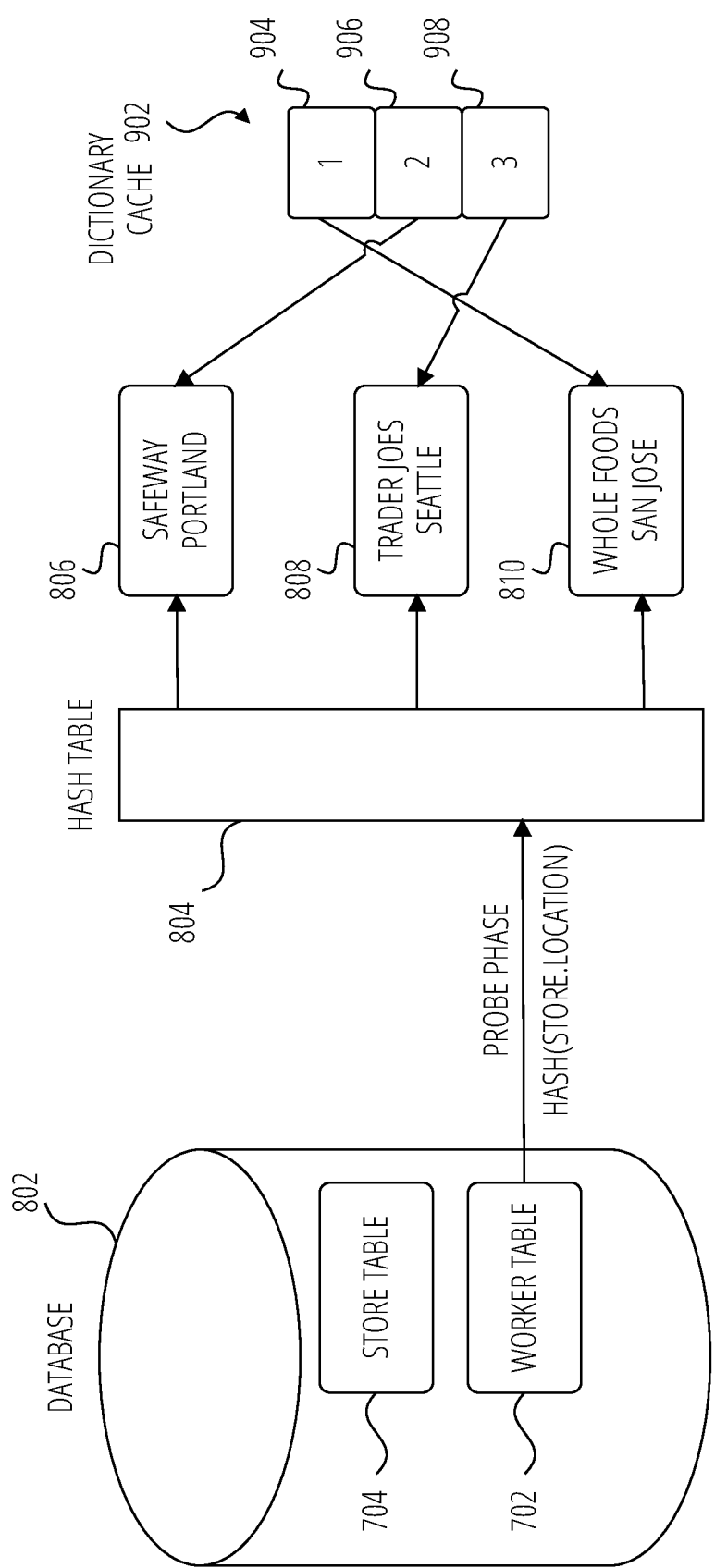
FIG. 9D is a block diagram illustrating an example probe phase of a hash join operation, in accordance with some embodiments of the present disclosure.

FIG. 9D is a block diagram illustrating an example probe phase of a hash join operation in accordance with one embodiment. The third row of worker table 702 indicates a location of SEATTLE. Using the dictionary metadata 706, the hash join module 232 identifies that the dictionary value corresponding to SEATTLE is 2. The hash join module 232 further detects that the corresponding dictionary entry is empty. This is represented by no arrows coming out of entry 908.

The hash join module 232 calculates the hash value to find an entry in the hash table 804. After computing the hash value, the hash join module 232 updates the corresponding dictionary entry (entry 908) to store the lookup result. This update is represented by an arrow from entry 908 to trader joes seattle 808).

After the hash join module 232 probes the first three rows, the dictionary cache 902 now contains the same information as in the hash table 804. For the next three rows in the worker table 702, the hash join module 232 probes the dictionary cache 902 based on dictionary values instead. Accessing dictionary values and conducting array lookup requires less computational resources than performing hash value calculation and key comparison in hash table lookup.

Figure 9E:
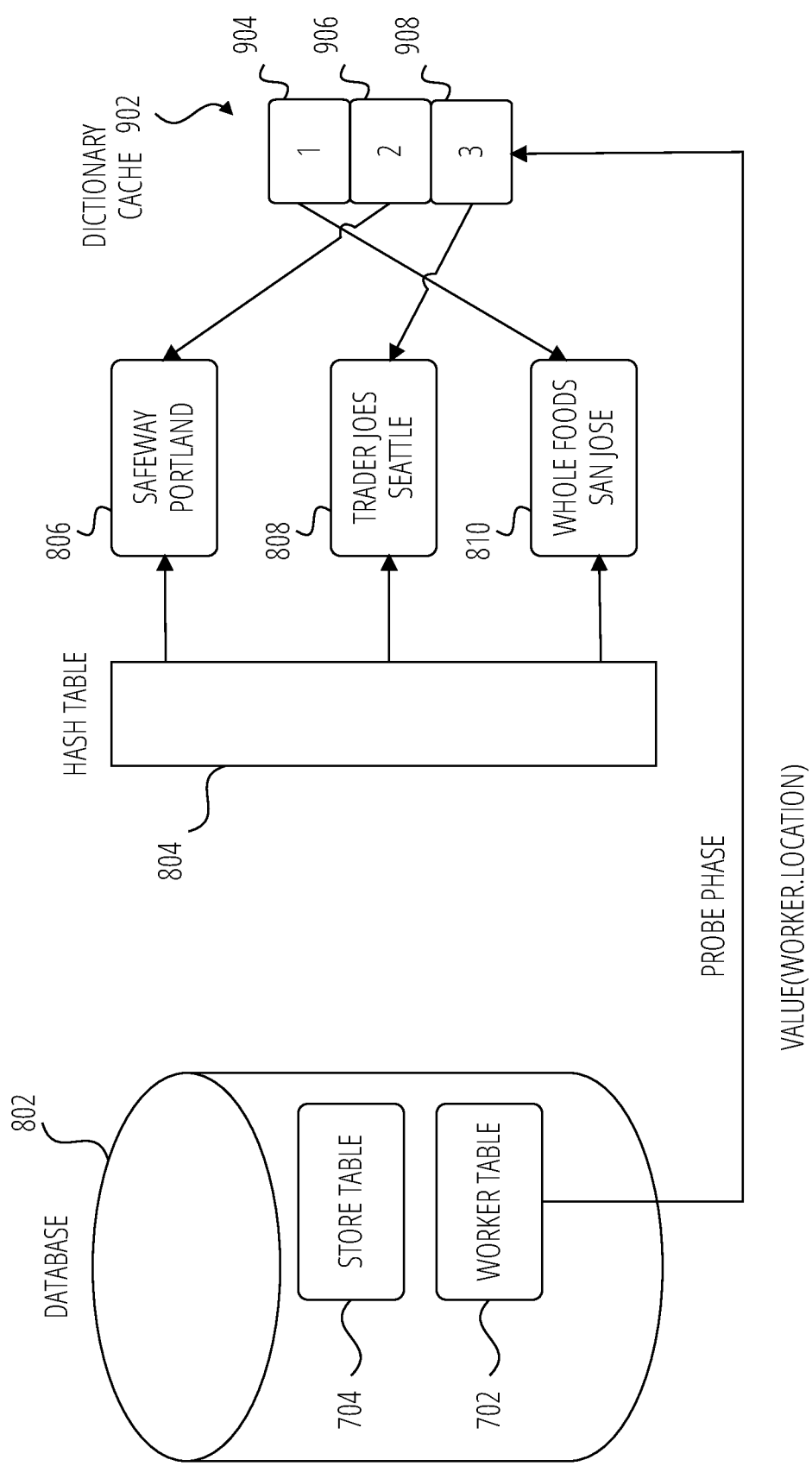
FIG. 9E is a block diagram illustrating an example probe phase of a hash join operation, in accordance with some embodiments of the present disclosure.

FIG. 9E is a block diagram illustrating an example probe phase of a hash join operation in accordance with one embodiment. The fourth row of worker table 702 indicates a location of SEATTLE. Using the dictionary metadata 706, the hash join module 232 identifies that the dictionary value corresponding to SEATTLE is 3. The hash join module 232 further detects that the corresponding dictionary entry in the dictionary cache 902 is full. As such, the hash join module 232 uses the dictionary cache 902 to obtain the lookup result (instead of calculating hash values for the hash table 804).

The fifth row of worker table 702 indicates a location of SEATTLE. Using the dictionary metadata 706, the hash join module 232 identifies that the dictionary value corresponding to SEATTLE is 3. The hash join module 232 further detects that the corresponding dictionary entry in the dictionary cache 902 is full. As such, the hash join module 232 uses the dictionary cache 902 to obtain the lookup result (instead of calculating hash values for the hash table 804).

The sixth row of worker table 702 indicates a location of SAN JOSE. Using the dictionary metadata 706, the hash join module 232 identifies that the dictionary value corresponding to SAN JOSE is 1. The hash join module 232 further detects that the corresponding dictionary entry in the dictionary cache 902 is full. As such, the hash join module 232 uses the dictionary cache 902 to obtain the lookup result (instead of calculating hash values for the hash table 804).

Figure 10:
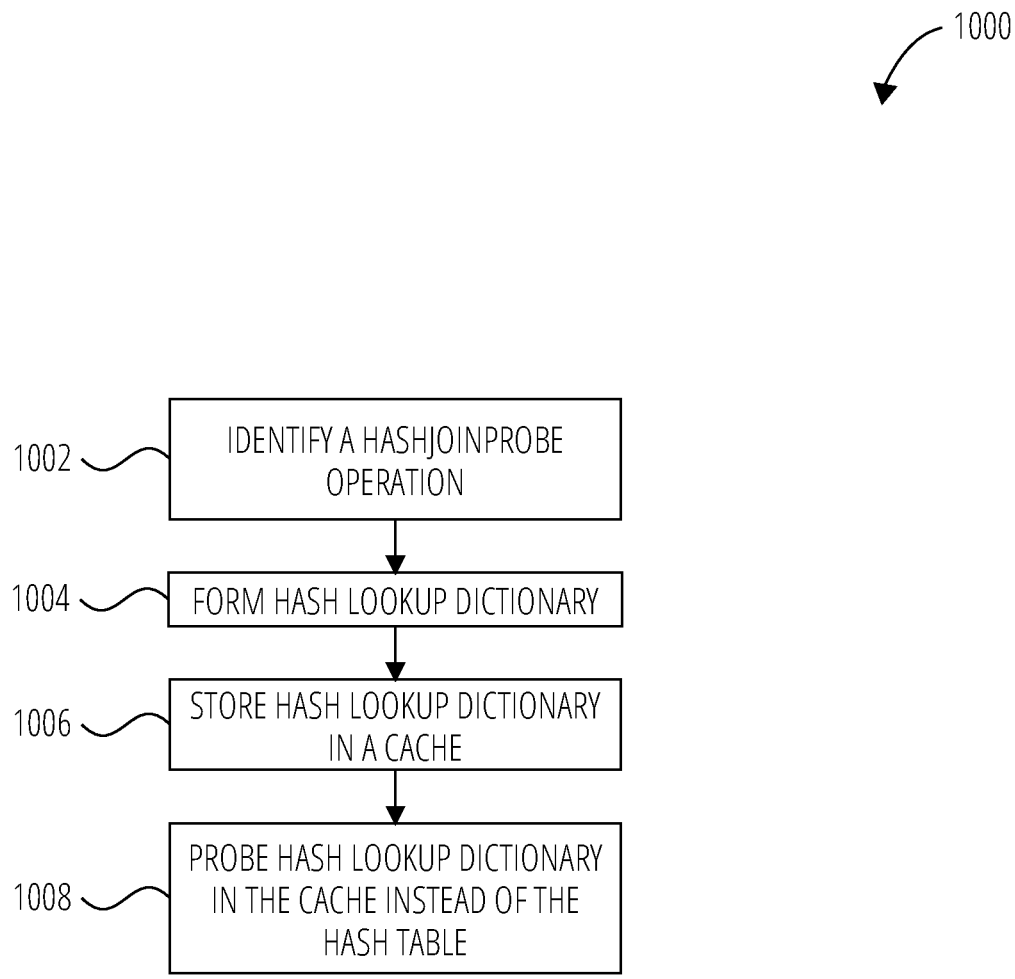
FIG. 10 is a flow diagram illustrating a method for probing a hash lookup dictionary cache, in accordance with some embodiments of the present disclosure.

FIG. 10 is a flow diagram illustrating a method 1000 for probing a hash lookup dictionary cache in accordance with one example embodiment. The method 1000 may be performed by one or more computational devices, as described below. Operations in the method 1000 may be performed by the database service manager 108, using components (e.g., modules, engines) described above with respect to FIG. 2. Accordingly, the method 1000 is described by way of example with reference to the database service manager 108. However, it shall be appreciated that at least some of the operations of the method 1000 may be deployed on various other hardware configurations or be performed by similar components residing elsewhere. For example, some of the operations may be performed at the execution platform 102.

At block 1002, the hash join module 232 detects a hashjoinprobe operation at the database service manager 108. For example, the request processing service 206 receives a request to join tables in data storage device 214 or data storage device 222.

In block 1004, the hash join module 232 forms a lookup dictionary. In one example, during a probe phase of the hash join module 232, the hash join module 232 calculates the hash value for a hash table. After computing the hash value, the hash join module 232 updates a corresponding dictionary entry to store the lookup result in the lookup dictionary.

In block 1006, the hash join module 232 stores the hash lookup dictionary in a cache. For example, the hash join module 232 stores lookup results in the lookup dictionary in a one-dimensional array cache.

In block 1008, the hash join module 232 probes the hash lookup dictionary in the cache instead of the hash table. For example, the hash join module 232 identifies that a dictionary value corresponding to an entry from a row using dictionary metadata. The hash join module 232 further detects that the corresponding dictionary entry in the hash lookup dictionary is full. Instead of calculating hash values for the hash table, the hash join module 232 accesses the dictionary cache 902 to obtain the lookup result.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

In other example embodiments, the present application describes adding a cache for hash join probing. The form of this cache depends on the compression format of a column. For example:
- if the probe-side join key is RLE encoded, the cache can store the probing results of a row and reuse it for the next N rows.
- If the number of distinct probe-side join keys is known to be small beforehand but the join keys are not dictionary encoded, the cache can store a mapping from a unique probe-side join key combination to probing results.

Figure 11:
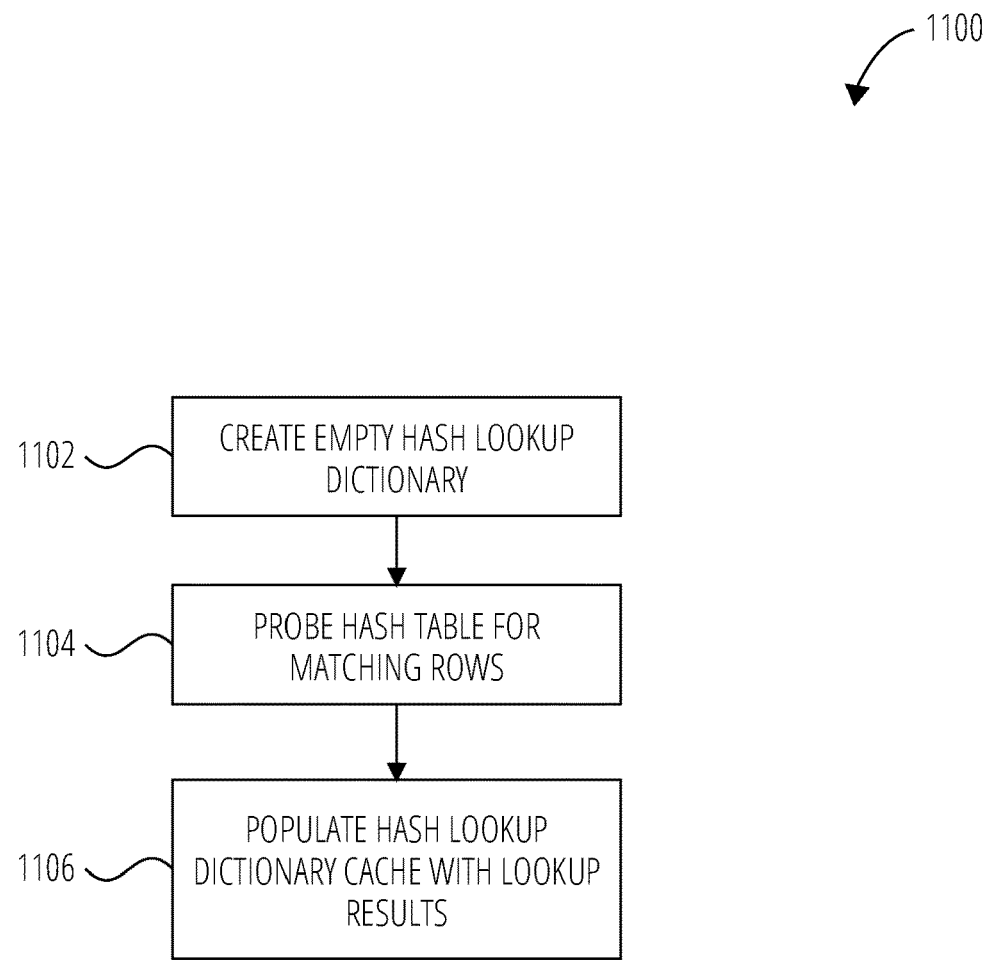
FIG. 11 is a flow diagram illustrating a method for forming a hash lookup dictionary cache, in accordance with some embodiments of the present disclosure.

FIG. 11 is a flow diagram illustrating a method 1100 for forming a hash lookup dictionary cache in accordance with one example embodiment. The method 1100 may be performed by one or more computational devices, as described below. Operations in the method 1100 may be performed by the database service manager 108, using components (e.g., modules, engines) described above with respect to FIG. 2. Accordingly, the method 1100 is described by way of example with reference to the database service manager 108. However, it shall be appreciated that at least some of the operations of the method 1100 may be deployed on various other hardware configurations or be performed by similar components residing elsewhere. For example, some of the operations may be performed at the execution platform 102.

In block 1102, the hash join module 232 forms an empty hash lookup dictionary. In one example, the empty hash lookup dictionary is stored in a cache.

In block 1104, the hash join module 232 probes the hash table for matching rows. In one example, during a probe phase of the hash join module 232, the hash join module 232 calculates the hash value for the hash table.

In block 1106, the hash join module 232 populates the hash lookup dictionary cache with the lookup results. After computing the hash value in block 1104, the hash join module 232 updates a corresponding dictionary entry to store the lookup result in the hash lookup dictionary cache.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 12:
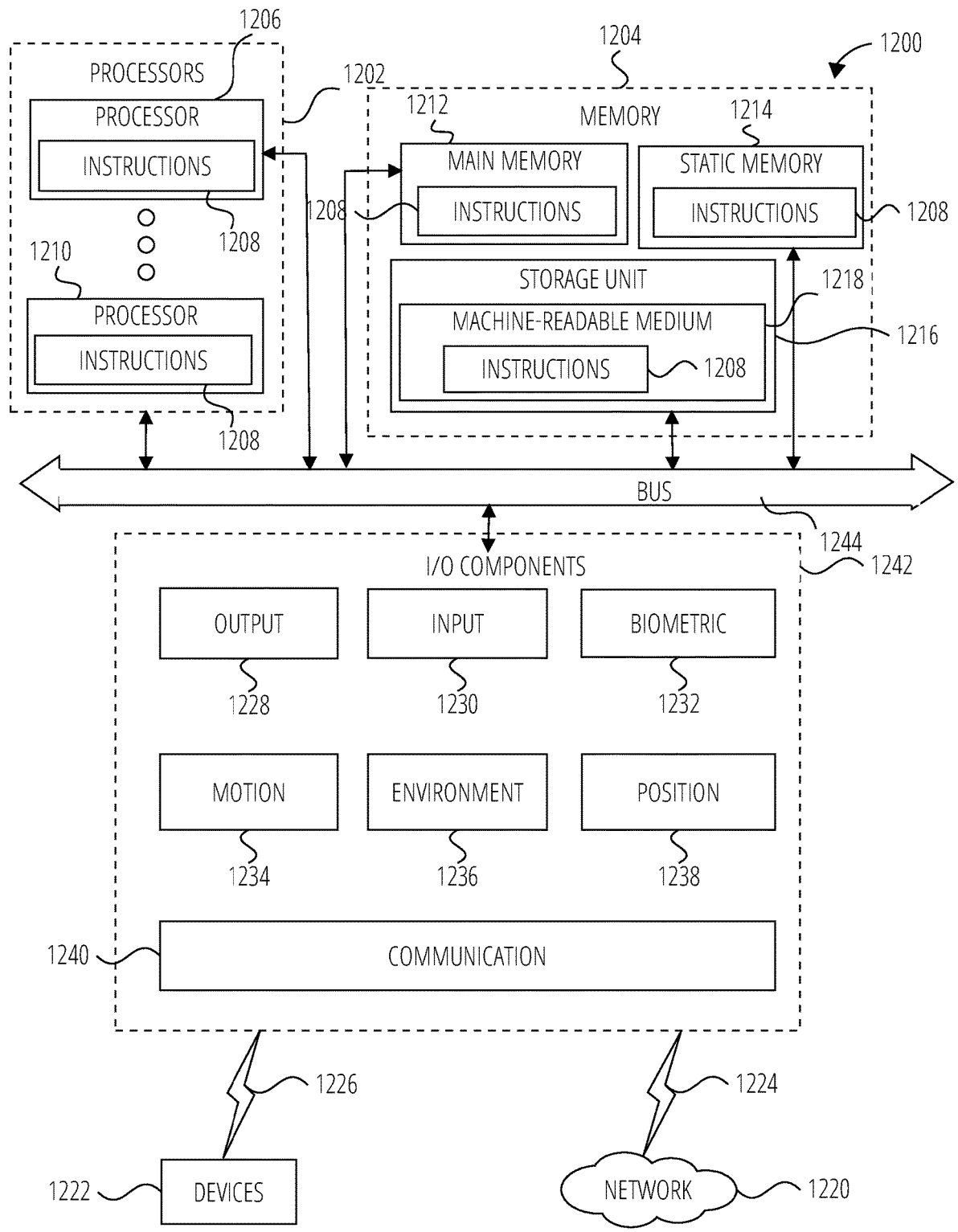
FIG. 12 is a diagrammatic representation of a machine in the form of a computer system within which a set of instructions may be executed for causing the machine to perform any one or more of the methodologies discussed herein, according to an example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include Processors 1202, memory 1204, and I/O Components 1242, which may be configured to communicate with each other via a bus 1244. In an example embodiment, the Processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1206 and a Processor 1210 that execute the instructions 1208. The term "Processor" is intended to include multi-core Processors that may comprise two or more independent Processors (sometimes referred to as "cores") that may execute instructions contemporaneously. Although FIG. 12 shows multiple Processors 1202, the machine 1200 may include a single Processor with a single core, a single Processor with multiple cores (e.g., a multi-core Processor), multiple Processors with a single core, multiple Processors with multiples cores, or any combination thereof.

The memory 1204 includes a main memory 1212, a static memory 1214, and a storage unit 1216, both accessible to the Processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the Processors 1202 (e.g., within the Processor's cache memory), or any suitable combination thereof, during execution thereof by the machine 1200.

The I/O Components 1242 may include a wide variety of Components to receive input, provide output, produce output, transmit information, exchange information, capture measurements, and so on. The specific I/O Components 1242 that are included in a particular machine will depend on the type of machine. For example, portable machines such as mobile phones may include a touch input device or other such input mechanisms, while a headless server machine will likely not include such a touch input device. It will be appreciated that the I/O Components 1242 may include many other Components that are not shown in FIG. 12. In various example embodiments, the I/O Components 1242 may include output Components 1228 and input Components 1230. The output Components 1228 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1230 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1242 may include biometric Components 1232, motion Components 1234, environmental Components 1236, or position Components 1238, among a wide array of other Components. For example, the biometric Components 1232 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1234 include acceleration sensor Components (e.g., accelerometer), gravitation sensor Components, rotation sensor Components (e.g., gyroscope), and so forth. The environmental Components 1236 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1238 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1242 further include communication Components 1240 operable to couple the machine 1200 to a network 1220 or devices 1222 via a coupling 1224 and a coupling 1226, respectively. For example, the communication Components 1240 may include a network interface Component or another suitable device to interface with the network 1220. In further examples, the communication Components 1240 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1222 may be another machine or any of a wide variety of peripheral devices (e.g., a peripheral device coupled via a USB).

Moreover, the communication Components 1240 may detect identifiers or include Components operable to detect identifiers. For example, the communication Components 1240 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the Processors 1202) and/or storage unit 1216 may store one or more sets of instructions and data structures (e.g., software) embodying or used by any one or more of the methodologies or functions described herein. These instructions (e.g., the instructions 1208), when executed by Processors 1202, cause various operations to implement the disclosed embodiments.

The instructions 1208 may be transmitted or received over the network 1220, using a transmission medium, via a network interface device (e.g., a network interface Component included in the communication Components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Described implementations of the subject matter can include one or more features, alone or in combination as illustrated below by way of example.

Example 1 is a computer-implemented method comprising: detecting, by a server comprising one or more processors, a request to perform a hash join operation on a data structure stored in a data storage device; forming a hash lookup dictionary based on lookup results in a hash table; storing the hash lookup dictionary in a cache; and probing, during a probing phase of the hash join operation, the cache.

Example 2 includes the method of example 1, wherein the data structure comprises a build-side table and a probe-side table.

Example 3 includes the method of example 2, wherein the hash table comprises hash values computed, during a build phase of the hash join operation, using the build-side table.

Example 4 includes the method of example 2, wherein probing the cache further comprises: probing for lookup results corresponding to an entry from a row in the probe-side table.

Example 5 includes the method of example 1, wherein forming the hash lookup dictionary further comprises: updating a dictionary entry of a corresponding computed hash value by storing a lookup result in a one-dimensional array of the hash lookup dictionary in the cache.

Example 6 includes the method of example 2, wherein forming the hash lookup dictionary further comprises: detecting that the corresponding dictionary entry in the hash lookup dictionary is full; and in response to detecting that the corresponding dictionary entry in the hash lookup dictionary is full, accessing the cache to obtain a lookup result corresponding to an entry from a row in the probe-side table.

Example 7 includes the method of example 2, wherein probing the cache further comprises: identifying a dictionary value corresponding to an entry from a row in the probe-side table using a dictionary table in the hash lookup dictionary.

Example 8 includes a computing apparatus comprising: a processor; and a memory storing instructions that, when executed by the processor, configure the apparatus to: detect, by a server comprising one or more processors, a request to perform a hash join operation on a data structure stored in a data storage device; form a hash lookup dictionary based on lookup results in a hash table; store the hash lookup dictionary in a cache; and probe, during a probing phase of the hash join operation, the cache.

Example 9 includes the computing apparatus of example 8, wherein the data structure comprises a build-side table and a probe-side table.

Example 10 includes the computing apparatus of example 9, wherein the hash table comprises hash values computed, during a build phase of the hash join operation, use the build-side table.

Example 11 includes the computing apparatus of example 9, wherein probing the cache further comprises: probe for lookup results corresponding to an entry from a row in the probe-side table.

Example 12 includes the computing apparatus of example 8, wherein forming the hash lookup dictionary further comprises: update a dictionary entry of a corresponding computed hash value by storing a lookup result in a one-dimensional array of the hash lookup dictionary in the cache.

Example 13 includes the computing apparatus of example 9, wherein forming the hash lookup dictionary further comprises: detect that the corresponding dictionary entry in the hash lookup dictionary is full; and in response to detecting that the corresponding dictionary entry in the hash lookup dictionary is full, access the cache to obtain a lookup result corresponding to an entry from a row in the probe-side table.

Example 14 includes the computing apparatus of example 9, wherein probing the cache further comprises: identify a dictionary value corresponding to an entry from a row in the probe-side table using a dictionary table in the hash lookup dictionary.

Example 15 is non-transitory computer-readable storage medium, the computer-readable storage medium including instructions that when executed by a computer, cause the computer to: detect, by a server comprising one or more processors, a request to perform a hash join operation on a data structure stored in a data storage device; form a hash lookup dictionary based on lookup results in a hash table; store the hash lookup dictionary in a cache; and probe, during a probing phase of the hash join operation, the cache.

Example 16 includes the computer-readable storage medium of example 15, wherein the data structure comprises a build-side table and a probe-side table.

Example 17 includes the computer-readable storage medium of example 16, wherein the hash table comprises hash values computed, during a build phase of the hash join operation, use the build-side table.

Example 18 includes the computer-readable storage medium of example 16, wherein probing the cache further comprises: probe for lookup results corresponding to an entry from a row in the probe-side table.

Example 19 includes the computer-readable storage medium of example 15, wherein forming the hash lookup dictionary further comprises: update a dictionary entry of a corresponding computed hash value by storing a lookup result in a one-dimensional array of the hash lookup dictionary in the cache.

Example 20 includes the computer-readable storage medium of example 16, wherein forming the hash lookup dictionary further comprises: detect that the corresponding dictionary entry in the hash lookup dictionary is full; and in response to detecting that the corresponding dictionary entry in the hash lookup dictionary is full, access the cache to obtain a lookup result corresponding to an entry from a row in the probe-side table.

What is claimed is:

1. A computer-implemented method comprising:
    detecting, by a server comprising one or more processors, a request to perform a hash join operation on a data structure stored in a data storage device;
    forming a hash lookup dictionary in a hash table, the hash lookup dictionary based on lookup results and unique join keys of the data structure;
    storing the hash lookup dictionary in a cache;
    updating a dictionary entry of a corresponding computed hash value by storing a lookup result in a one-dimensional array of the hash lookup dictionary that is indexed by dictionary positions in the cache; and
    probing, during a probing phase of the hash join operation, the hash lookup dictionary in the cache by identifying a dictionary value corresponding to an entry from a row in a probe-side table using a dictionary table in the hash lookup dictionary, wherein a number of hash lookups of the hash join operation includes a number of unique join keys in the hash table, each unique join key corresponding to a dictionary column set with a fixed number of entries, the size of the one-dimensional array representing a number of all combinations of the unique join keys.

2. The computer-implemented method of claim 1, wherein the data structure comprises a build-side table and the probe-side table, wherein the hash lookup dictionary is valid across rowsets from a same micro-partition file, wherein each hash lookup dictionary is generated separately for each micro-partition file of a plurality of micro-partition files of tables of the data structure, the tables being partitioned into the plurality of micro-partition files.

3. The computer-implemented method of claim 2, wherein the hash table comprises hash values computed, during a build phase of the hash join operation, using the build-side table.

4. The computer-implemented method of claim 2, wherein probing the hash lookup dictionary in the cache further comprises:
    probing for lookup results corresponding to the entry from the row in the probe-side table.

5. The computer-implemented method of claim 2, wherein forming the hash lookup dictionary further comprises:
    detecting that the corresponding dictionary entry in the hash lookup dictionary is full; and in response to detecting that the corresponding dictionary entry in the hash lookup dictionary is full, accessing the cache to obtain a lookup result corresponding to the entry from the row in the probe-side table.

6. The computer-implemented method of claim 1, wherein during the probing phase of the hash join operation, the hash lookup dictionary in the cache is probed instead of calculating hash values for the hash table.

7. A computing apparatus comprising:
a processor; and
a memory storing instructions that, when executed by the processor, configure the apparatus to:
detect, by a server comprising one or more processors, a request to perform a hash join operation on a data structure stored in a data storage device;
form a hash lookup dictionary in a hash table, the hash lookup dictionary based on lookup results and unique join keys of the data structure;
store the hash lookup dictionary in a cache;
update a dictionary entry of a corresponding computed hash value by storing a lookup result in a one-dimensional array of the hash lookup dictionary that is indexed by dictionary positions in the cache; and
probe, during a probing phase of the hash join operation, the hash lookup dictionary in the cache by identifying a dictionary value corresponding to an entry from a row in a probe-side table using a dictionary table in the hash lookup dictionary, wherein a number of hash lookups of the hash join operation includes a number of unique join keys in the hash table, each unique join key corresponding to a dictionary column set with a fixed number of entries, the size of the one-dimensional array representing a number of all combinations of the unique join keys.

8. The computing apparatus of claim 7, wherein the data structure comprises a build-side table and the probe-side table, wherein the hash lookup dictionary is valid across rowsets from a same micro-partition file, wherein each hash lookup dictionary is generated separately for each micro-partition file of a plurality of micro-partition files of tables of the data structure, the tables being partitioned into the plurality of micro-partition files.

9. The computing apparatus of claim 8, wherein the hash table comprises hash values computed, during a build phase of the hash join operation, use the build-side table.

10. The computing apparatus of claim 8, wherein probing the hash lookup dictionary in the cache further comprises:
probe for lookup results corresponding to the entry from the row in the probe-side table.

11. The computing apparatus of claim 8, wherein forming the hash lookup dictionary further comprises:
detect that the corresponding dictionary entry in the hash lookup dictionary is full; and
in response to detecting that the corresponding dictionary entry in the hash lookup dictionary is full, access the cache to obtain a lookup result corresponding to the entry from the row in the probe-side table.

12. The computing apparatus of claim 7, wherein during the probing phase of the hash join operation, the hash lookup dictionary in the cache is probed instead of calculating hash values for the hash table.

13. A non-transitory computer-readable storage medium, the computer-readable storage medium including instructions that when executed by a computer, cause the computer to:
detect, by a server comprising one or more processors, a request to perform a hash join operation on a data structure stored in a data storage device;
form a hash lookup dictionary in a hash table, the hash lookup dictionary based on lookup results and unique join keys of the data structure;
store the hash lookup dictionary in a cache;
update a dictionary entry of a corresponding computed hash value by storing a lookup result in a one-dimensional array of the hash lookup dictionary that is indexed by dictionary positions in the cache; and
probe, during a probing phase of the hash join operation, the hash lookup dictionary in the cache by identifying a dictionary value corresponding to an entry from a row in a probe-side table using a dictionary table in the hash lookup dictionary, wherein a number of hash lookups of the hash join operation includes a number of unique join keys in the hash table, each unique join key corresponding to a dictionary column set with a fixed number of entries, the size of the one-dimensional array representing a number of all combinations of the unique join keys.

14. The computer-readable storage medium of claim 13, wherein the data structure comprises a build-side table and the probe-side table, wherein the hash lookup dictionary is valid across rowsets from a same micro-partition file, wherein each hash lookup dictionary is generated separately for each micro-partition file of a plurality of micro-partition files of tables of the data structure, the tables being partitioned into the plurality of micro-partition files.

15. The computer-readable storage medium of claim 14, wherein the hash table comprises hash values computed, during a build phase of the hash join operation, use the build-side table.

16. The computer-readable storage medium of claim 14, wherein probing the cache further comprises:
probe for lookup results corresponding to the entry from the row in the probe-side table.

17. The computer-readable storage medium of claim 13, wherein forming the hash lookup dictionary further comprises:
detect that the corresponding dictionary entry in the hash lookup dictionary is full; and
in response to detecting that the corresponding dictionary entry in the hash lookup dictionary is full, access the cache to obtain a lookup result corresponding to the entry from the row in the probe-side table.

* * * * *